(12) United States Patent
Manzoni et al.

(10) Patent No.: US 8,242,210 B2
(45) Date of Patent: Aug. 14, 2012

(54) (PER)FLUOROELASTOMERIC COMPOSITIONS

(75) Inventors: Claudia Manzoni, Bologna (IT); Giovanni Comino, Monza (IT); Milena Stanga, Origgio (IT); Margherita Albano, Milan (IT)

(73) Assignee: Solvay Solexis S.p.A., Bollate MI (IT)

( * ) Notice: Subject to any disclaimer, the term of this patent is extended or adjusted under 35 U.S.C. 154(b) by 0 days.

(21) Appl. No.: 12/674,494

(22) PCT Filed: Aug. 11, 2008

(86) PCT No.: PCT/EP2008/060510
§ 371 (c)(1),
(2), (4) Date: May 18, 2011

(87) PCT Pub. No.: WO2009/027213
PCT Pub. Date: Mar. 5, 2009

(65) Prior Publication Data
US 2011/0263793 A1    Oct. 27, 2011

(30) Foreign Application Priority Data
Aug. 29, 2007 (EP) .................................. 07425543

(51) Int. Cl.
C08L 27/12 (2006.01)
C08F 214/26 (2006.01)
(52) U.S. Cl. ...................................... 525/199; 525/200
(58) Field of Classification Search .................. 525/199, 525/200
See application file for complete search history.

(56) References Cited

U.S. PATENT DOCUMENTS

| | | | |
|---|---|---|---|
| 3,752,787 A | 8/1973 | De Brunner | |
| 3,876,654 A | 4/1975 | Pattison | |
| 4,035,565 A | 7/1977 | Apotheker et al. | |
| 4,141,874 A | 2/1979 | Oka et al. | |
| 4,233,427 A | 11/1980 | Bargain et al. | |
| 4,243,770 A | 1/1981 | Tatemoto et al. | |
| 4,259,463 A | 3/1981 | Moggi et al. | |
| 4,394,489 A | 7/1983 | Aufdermarsh | |
| 4,564,662 A | 1/1986 | Albin | |
| 4,690,994 A | 9/1987 | Masuda et al. | |
| 4,694,045 A | 9/1987 | Moore | |
| 4,745,165 A | 5/1988 | Arcella et al. | |
| 4,789,717 A | 12/1988 | Giannetti et al. | |
| 4,864,006 A | 9/1989 | Giannetti et al. | |
| 4,943,622 A | 7/1990 | Naraki et al. | |
| 5,173,553 A | 12/1992 | Albano et al. | |
| 5,218,026 A | 6/1993 | Keiichi et al. | |
| 5,447,993 A | 9/1995 | Logothetis | |
| 5,767,204 A | 6/1998 | Iwa et al. | |
| 5,789,509 A | 8/1998 | Schmiegel | |
| 6,323,283 B1 | 11/2001 | Apostolo et al. | |
| 6,838,512 B2 | 1/2005 | Eggers et al. | |
| 7,815,806 B2 * | 10/2010 | Cooper et al. | ................ 210/660 |
| 2006/0041069 A1 | 2/2006 | Sumi et al. | |
| 2012/0029152 A1 * | 2/2012 | Fukuoka et al. | ............... 525/193 |

FOREIGN PATENT DOCUMENTS

| | | |
|---|---|---|
| EP | 0120462 A1 | 10/1984 |
| EP | 0136596 A2 | 4/1985 |
| EP | 0182299 A2 | 5/1986 |
| EP | 0199138 A2 | 10/1986 |
| EP | 0335705 A1 | 10/1989 |
| EP | 0410351 A1 | 1/1991 |
| EP | 0434046 A1 | 6/1991 |
| EP | 0661304 A1 | 7/1995 |
| EP | 0684277 A1 | 11/1995 |
| EP | 0708797 A1 | 5/1996 |
| EP | 0769520 A1 | 4/1997 |
| EP | 0860436 A1 | 8/1998 |
| EP | 0924257 A1 | 6/1999 |
| WO | WO 97/05122 A1 | 2/1997 |
| WO | WO 2005/056618 A1 | 6/2005 |

OTHER PUBLICATIONS

Carlson D.P. and Schmiegel W., "Fluoroelastomers", Ullmann's Encyclopedia of Industrial Chemistry, 5th Edition, 1988, vol. A-11, p. 417-429 (VCH Verlagsgesellschaft); 15 pgs.
Standard ASTM D2230-96 (reapproved 2002), "Standard Test Method for Rubber Property-Extrudability of Unvulcanized Compounds", p. 1-4.
Standard ASTM D3417-99, "Standard Test Method for Enthalpies of Fusion and Crystallization of Polymers by Differential Scanning Calorimetry (DSC)"—Withdrawn in 2004 and replaced with ASTM D3418—only Abstract attached.

* cited by examiner

Primary Examiner — Nathan M Nutter
(74) Attorney, Agent, or Firm — Xuping Fu

(57) ABSTRACT

Extrudable (per)fluoroelastomer compositions comprising crosslinkable (per)fluoroelastomers having:
- at least two glass transition temperatures Tg on DSC analysis,
- at least one melting peak on DSC analysis with a ΔH of second melting of between 0.3 and 5.5 J/g, and
- a bimodal molecular weight distribution such that the ratio $Mn_1/Mn_2$ is between 10 and 30, wherein $Mn_1$ represents the number-average molecular weight of the distribution of the high molecular weight fluoroelastomer and $Mn_2$ represents the number-average molecular weight of the distribution of the low molecular weight fluoroelastomer.

17 Claims, No Drawings

(PER)FLUOROELASTOMERIC COMPOSITIONS

The present invention relates to crosslinkable fluoroelastomers for extrusion with improved processability, combined with less die-swell, optimum size dimensional stability of the extrudate before curing, even for extruded tubes of large dimensions, for instance with a diameter of 25-30 mm and with thin walls, for example of 0.5-2.5 mm, and improved surface properties, while at the same time maintaining good chemical resistance, good mechanical properties and good sealing properties.

More particularly, the invention relates to fluoroelastomers with improved processability, intended as improved linear velocity of the extrudate (cm/min of extruded product), combined with an extrudate outer surface that is substantially free of defects, for instance bubbles, striations or roughness, for instance sharkskin. The combination of the abovementioned properties is also obtained for the extrusion of manufactured products of complex geometry, and also with many corners.

Various types of fluoroelastomers are known in the art, which are widely used in all the sectors in which optimum elastic properties associated with high thermochemical dimensional stability are required. For further details regarding these products see, for example, "Ullmann's Encyclopedia of Industrial Chemistry", vol. A-11, pp. 417-429 (1988, VCH Verlagsgesellschaft).

It is also known that the curing of fluoroelastomers may be performed either ionically or by using peroxides. In the first case, suitable curing agents (for example polyhydroxylated compounds) combined with accelerators (for example tetraalkyammonium or tetraalkylphosphonium salts, or phosphoranamine salts) are added to the fluoroelastomer. In the case of peroxide curing, the polymer must contain curing sites that are capable of forming radicals in the presence of peroxides. To this end, "cure-site" monomers containing iodine and/or bromine may be introduced into the chain, as described, for example, in patents U.S. Pat. Nos. 4,035,565, 4,745,165 and EP 199 138, or chain-transfer agents containing iodine and/or bromine may be used during the polymerization phase, to give rise to iodinated and/or brominated end groups. See, for example, patents U.S. Pat. Nos. 4,243,770 and 5,173,553.

U.S. Pat. No. 6,323,283 concerns crosslinkable fluoroelastomers obtained by mixing (weight %):

a1) from 20% to 70% of a fluoroelastomer with a Mooney viscosity ML 1+10 at 121° C.>60, the fluoroelastomer containing iodine, b1) from 0% to 70% of a fluoroelastomer with a Mooney viscosity ML 1+10 at 121° C. of between 20 and 60, the fluoroelastomer containing iodine, c1) from 5% to 60% of a fluoroelastomer with a Mooney viscosity ML 1+10 at 121° C. of between 1 and 20, the fluoroelastomer containing iodine, in which the fluoroelastomers comprise monomer units derived from a bis-olefin. When the fluoroelastomer mixtures are peroxide-cured, they allow the production of articles with high mechanical properties, an improved compression set and excellent mould release properties. One of the drawbacks of these fluoroelastomer mixtures is that it is not possible to obtain an extruded article with good size dimensional stability before curing.

U.S. Pat. No. 4,690,994 describes a fluoroelastomer containing (weight %) 65-100% of a unit derived from VDF and HFP and from 0 to 35% of TFE, characterized by a VDF/HFP unit weight ratio of from 80/20 to 50/50, an intrinsic viscosity of between 250 and 500 ml/g, an Mw/Mn ratio of between 2 and 12, and having a bimodal molecular weight distribution, and a ratio $h_2/h_1$, in which $h_2$ is the peak height of the high molecular weight fraction and $h_1$ is the peak height of the low molecular weight fraction, both obtained from the GPC graph, of between 0.8 and 4.0. The fluoroelastomers of the said patent show high thermal resistance and chemical resistance. In addition, they also have high mechanical properties and a good compression set and good processability, despite the fact that high molecular weights are used. No mention is made in the said patent of the fact that the fluoroelastomers described can be used for extrusion to give manufactured products having the properties indicated above.

U.S. Pat. No. 5,218,026 describes multimodal, in particular, bimodal, fluoroelastomers which undergo mixed curing, ionic curing using a polyol and a polyamine as curing agents, and peroxide curing comprising a peroxide and a polyfunctional crosslinking coagent. The fluoroelastomers comprise VDF units, HFP units and TFE units of from 0 to 35% by weight and have an intrinsic viscosity of from 40 to 200 ml/g. The weight ratio between the weight-average molecular weight and the number-average molecular weight is from 3 to 25. These fluoroelastomers show improved processability and improved chemical resistance, to heat and to solvents. However, these fluoroelastomers do not have good sealing properties and do not generally show good size dimensional stability of the extrudate when tubes are extruded also having large diameters, for example 25-30 mm, and thin walls, for example of about 0.5-2.5 mm (see the comparative examples of the present patent application). The fluoroelastomers are used for preparing fuel hoses and O-rings. These fluoroelastomers show good adhesion to metals and good mould release. To obtain the indicated combination of properties, it is necessary to use fluoroelastomers having the characteristics indicated above. The fluoroelastomers of the said patent do not show the optimum combination of properties that it would be desirable to obtain, and the compression sets measured at 200° C. for 70 hours are indeed unsatisfactory. This is a characteristic that is required by users as a measurement of good sealing properties.

U.S. Pat. No. 6,838,512 describes fluoroelastomer compositions for preparing cold-shrink products that are used, for example, for coating cables. These compositions are, for example, in the form of flexible tubes that are applied in dilated form by means of an internal support (core) onto the cables. On removing the core, the cold-shrink tube adheres to the cables. These fluoroelastomer compositions comprise a first fluorinated terpolymer with a weight-average molecular weight from about $10^7$ to about $10^8$ and a second fluorinated terpolymer with a weight-average molecular weight centred on about $10^4$. The two polymers are mixed together. The fluoroelastomer composition may comprise other components such as processing coadjuvants, fillers, oils and crosslinking agents. The said patent concerns the preparation of cold-shrink articles, i.e. manufactured products that shrink and adhere to cables when cold. The fluoroelastomers used for these applications do not show the combination of properties that would be desirable for extruded tubes, in particular the size dimensional stability of the extrudate before curing.

U.S. Pat. No. 4,141,874 describes an elastomeric copolymer of VDF and of at least one other fluorinated monomer with an intrinsic viscosity of from 0.4 to 1.3 at 35° C. in MEK. The copolymer is prepared via a two-step polymerization process. In this first step, the monomers are copolymerized in aqueous medium until an intrinsic viscosity of from 0.01 to 3 at 35° C. in MEK is obtained, and in the second step polymerization is performed in aqueous medium in the presence of an oil-soluble radical polymerization initiator. An elastomeric copolymer comprising from 1% to 80% by weight of the elastomer obtained in the first step and from 20% to 99% of the elastomer obtained in the second step is obtained. The description speaks generally of extrusion, but no examples are given. The properties of the extrudate are not discussed. No indications are given regarding the characteristics that the fluoroelastomer composition must have in order to obtain the desired combination of properties.

There was thus felt to be a need for extrusion-crosslinkable fluoroelastomers having the following combination of properties:
   improved extrusion velocity in terms of linear productivity, i.e. linear velocity cm/min of extrudate,
   reduced die-swell of the extrudate,
   improved size dimensional stability of the extrudate before curing, even for extruded tubes of large dimensions, for instance of diameter 25-30 mm and with thin walls, for example of 0.5-2.5 mm,
   substantial absence of surface defects of the extrudate, for instance bubbles, striations or rugosity (shark skin),
   good chemical resistance,
   good mechanical properties,
   good sealing properties, i.e. good compression set values,
   extrusion of manufactured products of complex geometry, even having numerous corners, with the combination of properties indicated above.

The Applicant has found, surprisingly and unexpectedly, extrusion fluoroelastomers that have the combination of properties indicated above.

One subject of the present invention is an extrudable (per)fluoroelastomer composition comprising crosslinkable (per)fluoroelastomers having at least two glass transition temperatures Tg on DSC analysis, at least one melting peak on DSC analysis with a ΔH (enthalpy) of second melting of between 0.3 and 5.5 J/g and preferably between 0.4 and 4 J/g, a bimodal molecular weight distribution such that the ratio $Mn_1/Mn_2$ is between 10 and 30 and preferably between 15 and 25, in which $Mn_1$ represents the number-average molecular weight of the distribution of the high molecular weight fluoroelastomer and $Mn_2$ represents the number-average molecular weight of the distribution of the low molecular weight fluoroelastomer.

The term "glass transition temperature" means the temperature measured at the midpoint (Tg midpoint).

In particular, according to one embodiment of the invention, the extrusion (per)fluoroelastomer compositions of the invention comprise:
a) a (per)fluoroelastomer with a glass transition temperature Tg1,
b) a (per)fluoroelastomer with a glass transition temperature Tg2,
Tg1 being different from Tg2.

Preferably, the difference in absolute value γ between Tg1 and Tg2 is at least 6° C.

It has been found, surprisingly and unexpectedly, by the Applicant that, in the composition of the invention, the presence of two different Tg values leads to the production of extrudates with low die swelling combined with a high linear velocity of the extrudate.

The (per)fluoroelastomer a) preferably has a number-average molecular weight $Mn_2$ of between about 5,000 and about 40,000, the (per)fluoroelastomer b) preferably has a number-average molecular weight $Mn_1$ of between about 100,000 and about 500,000, and the mixture of the two (per)fluoroelastomers should show an extrudable bimodal molecular weight distribution as defined above.

The (per)fluoroelastomer a) preferably has a number-average molecular weight $Mn_2$ of between about 10,000 and about 30,000, and the (per)fluoroelastomer b) preferably has a number-average molecular weight $Mn_1$ of between about 150,000 and about 350,000.

In general, the bimodal (per)fluoroelastomer composition of the invention may be obtained by mixing latices of the two (per)fluoroelastomers obtained from the polymerization.

The mixture of (per)fluoroelastomers of the invention may be constituted by more than two (per)fluoroelastomers provided that the final mixture shows on DSC analysis two Tg values, at least one melting point and a bimodal molecular weight distribution such that the ratio $Mn_1/Mn_2$ is between 10 and 30.

As stated, the curable mixture of (per)fluoroelastomers of the invention shows crystallinity, as indicated by the presence of at least one ΔH of second melting on DSC analysis. The crystallinity may be due to the (per)fluoroelastomer a) of Tg=Tg1, or to the (per)fluoroelastomer b) of Tg=Tg2, or alternatively to both. Preferably, the crystallinity is due to the (per)fluoroelastomer a). The crystallinity in the individual (per)fluoroelastomers may also be greater than the value indicated in the composition, provided that the final composition has a melting ΔH value measured on DSC within the limits indicated above. Preferably, in the (per)fluoroelastomer mixture, the two (per)fluoroelastomers a) and b) are in a perfluoroelastomer a): perfluoroelastomer b) weight ratio of from 10:90 to 50:50 and preferably from 20:80 to 40:60.

The (per)fluoroelastomer a) may show more than one Tg; analogously, this may also be the case for the (per)fluoroelastomer b). In this case, the term "difference in absolute value γ" means the difference between the two closest Tg values, one belonging to the elastomer a) and the other to the elastomer b), respectively. The case where only one of the two (per)fluoroelastomers has more than one Tg value while the other has only one value may also apply. In this case also, the term "difference in absolute value γ" means the difference between the two closest Tg values, one belonging to the elastomer a) and the other to the elastomer b).

The (per)fluoroelastomers used in the present invention belong to the following classes:
(1) VDF-based copolymers, in which VDF is copolymerized with at least one comonomer chosen from the following:
   $C_2$-$C_8$ perfluoroolefins, such as tetrafluoroethylene (TFE) or hexafluoropropene (HFP),
   $C_2$-$C_8$ chloro- and/or bromo- and/or iodofluoroolefins, such as chlorotrifluoroethylene (CTFE) and bromotrifluoroethylene,
   (per)fluoroalkyl vinyl ethers (PAVE) $CF_2$=$CFOR_f$, in which $R_f$ is a $C_1$-$C_6$ (per) fluoroalkyl, for example trifluoromethyl, bromodifluoromethyl or pentafluoropropyl,
   perfluorooxyalkyl vinyl ethers $CF_2$=CFOX, in which X is a $C_1$-$C_{12}$ perfluorooxyalkyl containing one or more ether groups, for example perfluoro-2-propoxypropyl,
   fluorovinyl ethers (MOVE) of general formula $CFX_f$=$CX_fOCF_2OR_f$, in which $R_f$ is a linear or branched $C_1$-$C_6$ perfluoroalkyl group or a linear or branched $C_1$-$C_6$ perfluorooxyalkyl group containing from one to three oxygen atoms, $X_f$=F or H, preferably F; the preferred compounds are those of formulae $CF_2$=$CFOCF_2OCF_2CF_3$ (MOVE I), $CF_2$=$CFOCF_2OCF_2CF_2OCF_3$ (MOVE II) and $CF_2$=$CFOCF_2OCF_3$ (MOVE III),
   $C_2$-$C_8$ non-fluorinated olefins (Ol), for example ethylene and propylene, (2) TFE-based copolymers, in which TFE is copolymerized with at least one comonomer chosen from the following:
   (per)fluoroalkyl vinyl ethers (PAVE) $CF_2=CFOR_f$, in which $R_f$ is as defined above,
   perfluorooxyalkyl vinyl ethers $CF_2=CFOX$, in which X is as defined above,
   $C_2$-$C_8$ fluoroolefins containing hydrogen and/or chlorine and/or bromine and/or iodine atoms,
   fluorovinyl ethers (MOVE) of general formula $CFX_f=CX_fOCF_2OR_f$ as defined above,
   $C_2$-$C_8$ non-fluorinated olefins (Ol),
   perfluorovinyl ethers containing cyanide groups as described in patents U.S. Pat. No. 4,281,092, U.S. Pat. No. 5,447,993 and U.S. Pat. No. 5,789,489.

Preferred compositions (in mol %) are the following, 100% being the sum of the mole percentages of the monomers:
(a) vinylidene fluoride (VDF) 35-85%, hexafluoropropene (HFP) 10-45%, tetrafluoroethylene (TFE) 0-30%, perfluoroalkyl vinyl ethers (PAVE) 0-15%,
(b) vinylidene fluoride (VDF) 50-80%, perfluoroalkyl vinyl ethers (PAVE) 5-50%, tetrafluoroethylene (TFE) 0-20%,
(c) vinylidene fluoride (VDF) 20-30%, $C_2$-$C_8$ non-fluorinated olefins (Ol) 10-30%, hexafluoropropene (HFP) and/or perfluoroalkyl vinyl ethers (PAVE) 18-27%, tetrafluoroethylene (TFE) 10-30%,
(d) tetrafluoroethylene (TFE) 50-80%, perfluoroalkyl vinyl ethers (PAVE) 20-50%,
(e) tetrafluoroethylene (TFE) 45-65%, $C_2$-$C_8$ non-fluorinated olefins (Ol) 20-55%, vinylidene fluoride 0-30%,
(f) tetrafluoroethylene (TFE) 32-60% mol %, $C_2$-$C_8$ non-fluorinated olefins (Ol) 10-40%, perfluoroalkyl vinyl ethers (PAVE) 20-40%, fluorovinyl ethers (MOVE) 0-30%,
(g) tetrafluoroethylene (TFE) 33-75%, perfluoroalkyl vinyl ethers (PAVE) 15-45%, vinylidene fluoride (VDF) 5-30%, hexafluoropropene HFP 0-30%,
(h) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%,
(i) tetrafluoroethylene (TFE) 20-70%, fluorovinyl ethers (MOVE) 30-80%, perfluoroalkyl vinyl ethers (PAVE) 0-50%.

Optionally, one or more (per)fluoroelastomers of the (per)fluoroelastomer compositions of the present invention also comprise monomer units derived from a bis-olefin having the general formula:

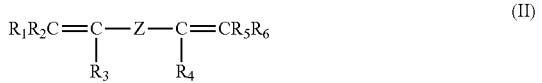

(II)

in which:
$R_1$, $R_2$, $R_3$, $R_4$, $R_5$ and $R_6$, which may be identical or different, are H or $C_1$-$C_5$ alkyl;
Z is a linear or branched $C_1$-$C_{18}$ alkylene or cycloalkylene radical, optionally containing oxygen atoms, preferably at least partially fluorinated, or a (per)fluoropolyoxyalkylene radical, as described in patent EP 661 304 in the name of the Applicant.

The amount of chain units derived from these bis-olefins is generally between 0.01 and 1.0 mol, preferably between 0.03 and 0.5 mol and even more preferably between 0.05 and 0.2 mol per 100 mol of the other monomer units indicated above constituting the fluoroelastomer.

The compositions of the invention may be obtained by mixing (per)fluoroelastomer latexes obtained by separately polymerizing the (per)fluoroelastomers with different Tg values, followed by coagulating the latices.

Manufactured products that are cured by means of ionic curing, peroxide curing and/or mixed curing may be obtained from the curable compositions of the invention.

A further subject of the present invention is cured manufactured products that may be obtained as indicated above.

When the (per)fluoropolymers that are the subject of the present invention are peroxide-cured, they preferably contain iodine and/or bromine atoms in the chain and/or at the end of the macromolecules. The introduction of these iodine and/or bromine atoms may be performed by addition to the reaction mixture of brominated and/or iodinated cure-site comonomers, such as bromo and/or iodo olefins containing from 2 to 10 carbon atoms (as described, for example, in U.S. Pat. No. 4,035,565 and U.S. Pat. No. 4,694,045), or iodo and/or bromo fluoroalkyl vinyl ethers (as described in patents U.S. Pat. No. 4,745,165, U.S. Pat. No. 4,564,662 and EP 199 138), in amounts such that the content of cure-site comonomers in the final product is generally between 0.05 and 2 mol per 100 mol of the other base monomer units.

Other iodinated compounds that may be used are triiodinated triazine derivatives, as described in European patent application EP 860 436 and in European patent application EP 1 320 016.

Alternatively or also in combination with the cure-site comonomers, it is possible to introduce terminal iodine and/or bromine atoms via addition to the reaction mixture of iodinated and/or brominated chain-transfer agents, for instance compounds of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, patents U.S. Pat. No. 4,243,770 and U.S. Pat. No. 4,943,622). It is also possible to use as chain-transfer agents alkali metal or alkaline-earth metal iodides and/or bromides, as described in patent U.S. Pat. No. 5,173,553.

In combination with the chain-transfer agents containing iodine and/or bromine, it is possible to use other chain-transfer agents known in the art, such as ethyl acetate, diethyl malonate, etc.

The peroxide curing is performed, according to known techniques via addition of a suitable peroxide that is capable of generating radicals by thermal decomposition. Among the agents most commonly used that may be mentioned are: dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl]carbonate. Other peroxide systems are described, for example, in patent applications EP 136 596 and EP 410 351.

Other products are then added to the curing mixture, such as:
(a) curing coagents, in amounts generally of between 0.5% and 10% and preferably between 1% and 7% by weight relative to the polymer; among these agents, the following are commonly used: triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl methyltrisiloxane, etc.; TAIC is particularly preferred; other preferred crosslinking agents are bis-olefins described in European patent application EP 769 520.

Other crosslinking agents that may be used are triazines described in European patent applications EP 860 436 and WO 97/05122;

(b) optionally, a metallic compound, in amounts of between 1% and 15% and preferably between 2% and 10% by weight relative to the weight of the polymer, chosen from oxides or hydroxides of divalent metals, for instance Mg, Zn, Ca or Pb, optionally combined with a salt of a weak acid, for instance Ba, Na, K, Pb, Ca stearates, benzoates, carbonates, oxalates or phosphites;

(c) optionally, acid acceptors of the metal non-oxide type, such as 1,8-bis(dimethylamino)naphthalene, octadecylamine, etc., as described in EP 708 797;

(d) other conventional additives, such as thickening fillers, pigments, antioxidants, stabilizers and the like.

When the (per)fluoroelastomer matrix contains cyanide groups, the curing of the fluoropolymers that are the subject of the present invention is performed using organotin compounds or biaromatic amine compounds as crosslinking agents, as described in patents U.S. Pat. No. 4,394,489, U.S. Pat. No. 5,767,204 and U.S. Pat. No. 5,789,509. This type of curing may be combined with curing of peroxide type, when the fluoroelastomer matrix contains iodine or bromine atoms, preferably in terminal positions, as described in patent U.S. Pat. No. 5,447,993.

The ionic curing is performed via addition of curing agents and accelerators that are well known in the art. The amounts of accelerators are between 0.05-5 phr and the curing agent between 0.5-15 phr and preferably 1-6 phr.

Aromatic or aliphatic polyhydroxylated compounds, or derivatives thereof, may be used as curing agents, as described, for example, in EP 335 705 and U.S. Pat. No. 4,233,427. Among these, mention will be made in particular of: dihydroxy, trihydroxy and tetrahydroxy benzenes, naphthalenes or anthracenes; bisphenols, in which the two aromatic rings are linked together via an aliphatic, cycloaliphatic or aromatic divalent radical, or alternatively via an oxygen or sulphur atom, or else a carbonyl group. The aromatic rings may be substituted with one or more chlorine, fluorine or bromine atoms, or with carbonyl, alkyl or acyl groups. Bisphenol AF is particularly preferred.

Examples of accelerators that may be used include: quaternary ammonium or phosphonium salts (see, for example, EP 335 705 and U.S. Pat. No. 3,876,654); aminophosphonium salts (see, for example, U.S. Pat. No. 4,259,463); phosphoranes (see, for example, U.S. Pat. No. 3,752,787); the imine compounds described in EP 182 299 and EP 120 462; etc. Quaternary phosphonium salts and aminophosphonium salts are preferred.

Instead of using the accelerator and the curing agent separately, it is also possible to use an adduct between an accelerator and a curing agent in a mole ratio of from 1:2 to 1:5 and preferably from 1:3 to 1:5, the accelerator being one of the organic onium compounds having a positive charge, as defined above, and the curing agent being chosen from the compounds indicated above, in particular dihydroxy or polyhydroxy or dithiol or polythiol compounds; the adduct being obtained by melting the product of reaction between the accelerator and the curing agent in the indicated mole ratios, or by melting the mixture of the 1:1 adduct supplemented with the curing agent in the indicated amounts. Optionally, an excess of the accelerator relative to that contained in the adduct may also be present.

The following are particularly preferred as cations for the preparation of the adduct: 1,1-diphenyl-1-benzyl-N-diethylphosphoranamine and tetrabutyl-phosphonium; particularly preferred anions are bisphenol compounds in which the two aromatic rings are bonded via a divalent radical chosen from perfluoroalkyl groups of 3 to 7 carbon atoms, and the OH groups are in the para position.

The preparation of the adduct is described in European patent application EP 684 277 in the name of the Applicant, which is included herein in its entirety by reference.

The ionic curing mixture also contains:
i) one or more mineral acid accelerators chosen from those known in the ionic curing of vinylidene fluoride copolymers, in amounts of 1-40 parts per 100 parts of fluoroelastomer copolymer;
ii) one or more basic compounds chosen from those known in the ionic curing of vinylidene fluoride copolymers, in amounts of from 0.5 to 10 parts per 100 parts of fluoroelastomer copolymer.

The basic compounds mentioned in point ii) are commonly chosen from the group constituted by $Ca(OH)_2$, $Sr(OH)_2$, $Ba(OH)_2$, metal salts of weak acids, for instance Ca, Sr, Ba, Na and K carbonates, benzoates, oxalates and phosphites and mixtures of the abovementioned hydroxides with the abovementioned metal salts; among the compounds of the type i), mention may be made of MgO.

The indicated amounts of the components of the mixture are relative to 100 phr of copolymer or terpolymer of the invention. As stated, other conventional additives, such as thickeners, pigments, antioxidants, stabilizers and the like, may then be added to the curing mixture.

The (per)fluoroelastomers of the present invention may also be cured via a mixed route combining the two types of curing.

The preparation of the (per)fluoroelastomers according to the present invention may be performed via copolymerization of the monomers in aqueous emulsion according to methods known in the art, in the presence of radical initiators, for example alkali metal or ammonium persulphates, perphosphates, perborates or percarbonates, optionally in combination with iron, copper or silver salts, or salts of other readily oxidizable metals. Surfactants of various types, among which fluorinated surfactants are particularly preferred, are also usually present in the reaction medium.

The polymerization is generally performed at temperatures of between 25 and 150° C., and at a pressure of up to 10 MPa.

The preparation of the (per)fluoroelastomers of the present invention is preferably performed in a microemulsion of (per) fluoropolyoxyalkylenes, as described in patents U.S. Pat. No. 4,789,717 and U.S. Pat. No. 4,864,006.

With the compositions of the invention, it is possible to produce composite articles that may be obtained by coextrusion with other elastomers, which may or may not be fluorinated, or by coextrusion with other fluorinated or non-fluorinated polymers. In particular, the coextrusion may take place between one or more of the (per)fluoroelastomer compositions of the invention and one or more fluorinated or non-fluorinated elastomers and/or one or more fluorinated or non-fluorinated thermoplastic polymers. Examples of preferred elastomers are NBR rubbers (nitrile/butadiene rubbers), ACM rubbers (acrylic rubbers), epichlorohydrin (ECO), etc. Examples of polymers that may be mentioned include KEVLAR, PVC, THV, PVDF, etc.

The compositions of the invention are, surprisingly and unexpectedly, found to be particularly suitable for producing extruded articles such as fuel pipes, extrudates from which are obtained O-rings, shaft seals, gaskets, diaphragms and valve sealing parts for chemical plants or for the automotive industry. As stated, the articles obtained by extrusion are obtained with high processability, i.e. with a high extrusion velocity and also with a high linear velocity of the extrudate in cm/min, combined with improved die-swell (i.e. a lower absolute value) and simultaneously good mechanical properties and good sealing properties, as demonstrated by the compression set value. In addition, the surfaces of the extrudate do not show any defects, for instance surface bubbles, striations or rugosity, for instance shark skin, and the extrudate shows high size dimensional stability before curing. In addition, the compositions of the invention are particularly suitable for producing manufactured products by extrusion, even of complex geometry, and even with numerous corners. It has been found, surprisingly and unexpectedly, that the extrudate before curing shows optimum size dimensional stability both for extruded tubes of small diameters and thin walls and with large diameters and thin or even thick walls. For example, it is possible to extrude with the compositions of the invention extruded tubes of large dimensions, for instance a diameter of 25-30 mm and with thin walls, for example 0.5-2.5 mm. The tubes that may be extruded with the compositions of the invention do not have any particular limitations, either as regards the diameter or as regards the thicknesses of the walls. Specifically, it is possible to extrude tubes of small diameter, for example from about 0.2 to about 10 mm, and with walls that are either thin, as indicated above, or thick, from greater than about 2.5 mm to 10 mm or greater. It is also possible to extrude tubes of large diameter, for example greater than 10 mm to about 50 mm or greater, and with walls that are either thin, as indicated above, or thick, from greater than about 2.5 mm to 10 mm or more.

Where desired, the compositions of the invention may also be used for producing articles by injection moulding with high processability, for example a high injection velocity, with good mechanical properties and good sealing properties, as demonstrated by the compression set value. The compositions of the invention may also be used for producing articles by compression moulding.

The examples that follow are given for the purpose of illustrating the invention and do not constitute a limitation of the scope thereof.

EXAMPLES

Characterization
Tests of Processability by Extrusion
The tests are performed according to method ASTM D2230 (Garvey test).
Size Dimensional Stability of the Extruded Tube
A 25×2.5 mm tube is extruded in the absence of a spindle and without cooling the extruded part in water on leaving the extrusion head. The extruded tube is left for 24 hours at a temperature of 23° C. The size dimensional stability is evaluated at the end of this period in the following manner:

| verdict | comments |
|---------|----------|
| yes | the tube has maintained the initial shape |
| no | the tube has not maintained the initial shape |

Determination of the Glass Transition and of the Heat of Fusion ($\Delta H$)

The glass transition is determined according to standard ASTM D3418 and the $\Delta H$ of fusion is determined according to standard ASTM D3417 using a Perkin Elmer Pyris DSC machine cooled with liquid nitrogen.

Determination of the Molecular Weight Distribution

The molecular weight distribution is determined by gel permeation chromatography (GPC). The polymer is dissolved in tetrahydrofuran (THF) at 30° C. until a 0.3% weight/volume solution concentration is obtained. 200 μl of solution are injected by means of a Waters® pump (model 590) into a set of 4 Waters®Styragel HR 300×7.5 mm styrene-divinylbenzene columns (Styragel®HR-6, Styragel®HR-5, Styragel®HR-4, Styragel®HR-3, with a precolumn) thermostatically maintained at a temperature of 30° C. A detector based on the measurement of the refractive index is used (Waters® refractive index mod. RI590). The chromatograms are acquired using polystyrene standards and the parameters of the Mark-Houwink equation relative to the fluoroelastomer.

The Mark-Houwink equation, which relates the elution volume ($V_e$) to the molecular weight (M), is as follows:

$$V_e = K \cdot M^{(\alpha+1)}$$

Knowing the values of the parameters K and α of polystyrene and of the fluoroelastomer in THF, it is possible to calculate for a given elution volume the molecular weight of the fluoroelastomer from the polystyrene molecular weight standards used, by means of the following equation:

$$V_e = K_{ps} \cdot M_{ps}^{(\alpha ps+1)} = K_{fluorine} \cdot M_{fluorine}^{(\alpha fluorine+1)}$$

in which
$K_{ps}$ and αps are the parameters of the equation relating to polystyrene,
$M_{ps}$ is the molecular weight of polystyrene corresponding to the elution volume $V_e$,
$K_{fluorine}$ and αfluorine are the parameters of the equation relating to the fluoroelastomer,
$M_{fluorine}$ is the molecular weight of the fluoroelastomer corresponding to the elution volume $V_e$.

The polystyrene standards that are used have the following molecular weights: 1,200; 1,700; 5,050; 10,200; 50,000; 68,000; 110,000; 195,000; 330,000; 490,000; 670,000; 1,080,000; 1,950,000; 2,950,000; 4,000,000.

Example 1

Preparation of the Fluoroelastomer a)
After evacuating the air, 6 litres of demineralized water and 3 ml of a microemulsion obtained by mixing together:
75 ml of a perfluoropolyoxyalkylene with an acid end group of formula:

$$Cl-(C_3F_6O)-(CF_2CF(CF_3)O)_{m1}-(CF(CF_3)O)_q-(CF_2O)_{n1}-CF_2COOH$$

in which n1=0.8% m1, q=9.2% m1 with an average molecular weight of 540 g/mol;
75 ml of an aqueous solution of $NH_3$ at 30% by volume;
150 ml of demineralized water;
45 ml of Galden® DO2 of formula:

$$CF_3O-(CF_2CF(CF_3)O)_m(CF_2O)_n-CF_3$$

in which m/n=20, with an average molecular weight of 450 g/mol,
were introduced into a 10 litre autoclave equipped with breakwaters and a stirrer operating at 545 rpm.

The autoclave was then brought to a temperature of 80° C. and maintained at this temperature throughout the reaction. The reactor is brought to a relative pressure of 25 bar by feeding in the monomers until the following composition of the gas phase is obtained: VDF/HFP/TFE 47/43/10 mol %.

Next, 12 g of ammonium persulphate (APS) are introduced as initiator; the reaction is initiated and the pressure is kept constant throughout the polymerization by feeding in a gaseous mixture constituted of VDF/HFP/TFE 67/13/20 mol %
After having fed 200 g of gaseous mixture into the reactor, 70.8 ml of 1,4-diiodoperfluorobutane ($C_4F_8I_2$) are introduced. After feeding in 3.2 kg of the gaseous monomer mixture, 57 ml of the microemulsion having the composition indicated above are introduced.

After feeding in 4 kg in total of the gaseous monomer mixture, the reaction is stopped, the autoclave is cooled and the latex emptied out.

An aliquot of the latex is coagulated with an aluminium sulphate solution and dried at 90° C. to constant weight. The product is analysed to determine the Tg, the ΔH of fusion and the molecular weight distribution.

The composition of the polymer is determined by NMR analysis and is found to be as follows (mol %): VDF 66%, HFP 13%, TFE 21%.

The results are given in Table 1.

Preparation of the Fluoroelastomer b)

After evacuating the air, 6 litres of demineralized water and 3 ml of a microemulsion having the same composition as that used in the preparation of the fluoroelastomer a) were introduced into a 10 litre autoclave equipped with breakwaters and a stirrer operating at 545 rpm.

The autoclave was then brought to a temperature of 80° C. and maintained at this temperature throughout the reaction. The reactor is brought to a relative pressure of 30 bar by feeding in the monomers until the following composition of the gaseous phase is obtained: VDF/HFP/TFE 27/62/11 mol %.

The following are then introduced:
8.6 ml of ethyl acetate as chain-transfer agent;
6 g of ammonium persulphate (APS) as initiator, distributed as follows:
    3 g of at the start of polymerization;
    4 portions of 0.75 g each per 800 g of monomer mixture fed in.

The reaction is started and the pressure is kept constant throughout the polymerization by feeding in a gaseous mixture constituted of VDF/HFP/TFE 55/25/20 mol %. After feeding in 3.2 kg of the gaseous monomer mixture, 57 ml of the microemulsion having the same composition as that used in the preparation of the fluoroelastomer a) are introduced.

After feeding in 4 kg in total of the gaseous monomer mixture, the reaction is stopped, the autoclave is cooled and the latex is emptied out.

An aliquot of the latex is coagulated with an aluminium sulfate solution and dried at 90° C. to constant weight. The product is analysed to determine the Tg, the ΔH of fusion and the molecular weight distribution.

The composition of the polymer is determined by NMR analysis and is found to be as follows (mol %): VDF 54%, HFP 24%, TFE 22%.

The results are given in Table 1.

Preparation of the Fluoroelastomer Composition

The latices prepared as described above are mixed in a 30/70 (fluoroelastomer a)/(fluoroelastomer b)) weight ratio relative to the solids. The mixture obtained is coagulated with an aluminium sulphate solution. The fluoroelastomer composition is dried at 90° C. to constant weight and analysed to determine the Tg and the ΔH of fusion. The results are given in Table 2.

The fluoroelastomer composition is formulated in a cylinder mixer by adding the following ingredients in the amounts specified below:

crosslinking additive: 2.5 phr of FOR XA31 (bisphenol AF/1,1-diphenyl-1-benzyl-N-diethylphosphoramine adduct in a 3:1 mol ratio);
basic compounds: 3 phr of MgO and 6 phr of $Ca(OH)_2$;
reinforcing filler: 8 phr of carbon black N990 MT.

The mixture obtained is characterized by means of the MDR curve (ASTM D6204-97), the mechanical properties (ASTM D412C) and the processability according to standard ASTM D2230 (Garvey test). The results are given in Table 3.

Comparative Example 2

A commercial fluoroelastomer, Tecnoflon® FOR 4391, is mixed with the following additives:
basic compounds: 3 phr of MgO and 6 phr of $Ca(OH)_2$;
reinforcing filler: 8 phr of carbon black N990 MT.

The mixture obtained is characterized as described in Example 1. The results are given in Table 3.

Comparative Example 3

Preparation of the Fluoroelastomer a)

After evacuation of the air, 6.5 litres of demineralized water and 55.7 ml of $C_4F_8I_2$ are introduced into the same autoclave used in Example 1.

The autoclave is then brought to a temperature of 80° C. and maintained at this temperature throughout the reaction. The reactor is brought to a relative pressure of 25 bar by feeding in the monomers until the following composition of the gaseous phase is obtained: VDF/HFP/TFE 34/54/12 mol %. 15 g of APS are then introduced; the reaction is started and the pressure is kept constant throughout the polymerization by feeding in a gaseous mixture constituted of VDF/HFP/TFE 60/20/20 mol %.

After feeding in 3 kg in total of the gaseous monomer mixture, the reaction is stopped, the autoclave is cooled and the latex is emptied out.

An aliquot of the latex is coagulated and dried as described in Example 1. The product is analysed as described in Example 1.

The composition of the polymer is as follows (mol %): VDF 60%, HFP 19%, TFE 21%.

The results are given in Table 1.

Preparation of the Fluoroelastomer b)

After evacuating the air, 6.5 litres of demineralized water are introduced into the same autoclave used in Example 1. The autoclave is then brought to a temperature of 80° C. and maintained at this temperature throughout the reaction. The reactor is brought to a relative pressure of 25 bar by feeding in the monomers until the following composition of the gaseous phase is obtained: VDF/HFP/TFE 34/54/12 mol %.

The following are then introduced:
3.4 ml of ethyl acetate as chain-transfer agent;
9.8 g of ammonium persulphate (APS) as initiator, distributed as follows:
    6.8 g at the start of polymerization;
    1.5 g after feeding in 1.8 kg of gaseous monomer mixture;
    1.5 g after feeding in 2.4 kg of gaseous monomer mixture.

The reaction is started and the pressure is kept constant throughout the polymerization by feeding in a gaseous mixture constituted of VDF/HFP/TFE 60/20/20 mol %. After feeding in 3 kg in total of the gaseous monomer mixture, the reaction is stopped, the autoclave is cooled and the latex is emptied out.

An aliquot of the latex is coagulated and dried as described in Example 1. The product is analysed as described in Example 1.

The composition of the polymer is found to be as follows (mol %): VDF 60%, HFP 19%, TFE 21%.

The results are given in Table 1.

Preparation of the Fluoroelastomer Composition

The latices prepared as described above are mixed together, coagulated, dried and characterized as described in Example 1.

The results are given in Table 2.

The fluoroelastomer composition is formulated as described in Example 1.

The mixture obtained is characterized as described in Example 1. The results are given in Table 3.

Comparative Example 4

A commercial fluoroelastomer, Tecnoflon® FOR TF636, is mixed with the same additives and in the same amounts as described in Comparative Example 2.

The mixture obtained is characterized as described in Comparative Example 2. The results are given in Table 3.

Example 5

Preparation of the Fluoroelastomer a)

After evacuating the air, 3.5 litres of demineralized water, 21 ml of $C_4F_8I_2$ and 35 ml of a microemulsion having the same composition as that used in Example 1 are introduced into a 5 litre autoclave equipped with breakwaters and a stirrer operating at 630 rpm.

The autoclave is then brought to a temperature of 80° C. and maintained at this temperature throughout the reaction. The reactor is brought to a relative pressure of 30 bar by feeding in the monomers until the following composition of the gaseous phase is obtained: VDF/HFP/TFE 9/82/9 mol %.

0.35 g of APS are then introduced; the reaction is started and the pressure is kept constant throughout the polymerization by feeding in a gaseous mixture constituted of VDF/HFP/TFE 39/36/25 mol %. Three portions of 0.175 g each of APS are added during the polymerization, after feeding in 590 g, 990 g and 1 190 g, respectively, of the gaseous monomer mixture.

After feeding in 1,250 g in total of the gaseous monomer mixture, the reaction is stopped, the autoclave is cooled and the latex is emptied out.

An aliquot of the latex is coagulated, dried and characterized as described in Example 1.

The composition of the polymer is found to be as follows (mol %): VDF 43%, HFP 28%, TFE 29%.

The results are given in Table 1.

Preparation of the Fluoroelastomer b)

After evacuating the air, 3.5 litres of demineralized water and 2 ml of a microemulsion having the same composition as that used in Example 1 are introduced into the same autoclave used in Example 5—preparation of the fluoroelastomer a). The autoclave is then brought to a temperature of 80° C. and maintained at this temperature throughout the reaction. The reactor is brought to a relative pressure of 30 bar by feeding in the monomers until the following composition of the gaseous phase is obtained: VDF/HFP/TFE 53/37/10 mol %.

The following are then introduced:
  4.6 ml of ethyl acetate as chain-transfer agent;
  3.5 g of ammonium persulphate (APS) as initiator, distributed as follows:
    1.75 g at the start of polymerization;
    4 portions of 0.437 g each per 300 g of monomer mixture fed in.

The reaction is started and the pressure is kept constant throughout the polymerization by feeding in a gaseous mixture constituted of VDF/HFP/TFE 72/8/20 mol %. After 1.2 kg of the gaseous monomer mixture have been fed in, 33 ml of the microemulsion having the same composition as that used in Example 1 are introduced.

After feeding in 1.5 kg in total of the gaseous monomer mixture, the reaction is stopped, the autoclave is cooled and the latex is emptied out.

An aliquot of the latex is coagulated, dried and characterized as described in Example 1.

The composition of the polymer is found to be as follows (mol %): VDF 71%, HFP 10%, TFE 19%.

The results are given in Table 1.

Preparation of the Fluoroelastomer Composition

The latices prepared as described above are mixed together, coagulated, dried and characterized as described in Example 1. The results are given in Table 2.

The fluoroelastomer composition is formulated as described in Example 1.

The mixture obtained is characterized as described in Example 1. The results are given in Table 4.

Example 6

Preparation of the Fluoroelastomer a)

The fluoroelastomer a) of Example 1 is used, see Table 1.

Preparation of the Fluoroelastomer b)

After evacuating the air, 3.5 litres of demineralized water and 2 ml of a microemulsion having the same composition as that used in Example 1 are introduced into the same autoclave used in Example 5. The autoclave is then brought to a temperature of 80° C. and maintained at this temperature throughout the reaction. The reactor is brought to a relative pressure of 30 bar by feeding in the monomers until the following composition of the gaseous phase is obtained: VDF/HFP/TFE 55/35/10 mol %.

The following are then introduced:
  3.1 ml of ethyl acetate as chain-transfer agent;
  3.5 g of ammonium persulphate (APS) as initiator, distributed as follows:
    1.75 g at the start of polymerization;
    4 portions of 0.437 g each per 300 g of monomer mixture fed in.

The reaction is started and the pressure is kept constant throughout the polymerization by feeding in a gaseous mixture constituted of VDF/HFP/TFE 50/30/20 mol %. After 1.2 kg of the gaseous monomer mixture have been fed in, 33 ml of the microemulsion having the same composition as that used in Example 1 are introduced.

After feeding in 1.5 kg of the gaseous monomer mixture, the reaction is stopped, the autoclave is cooled and the latex is emptied out.

An aliquot of the latex is coagulated, dried and characterized as described in Example 1.

The composition of the polymer is found to be as follows (mol %): VDF 58%, HFP 22%, TFE 20%.

The results are given in Table 1.

Preparation of the Fluoroelastomer Composition

The latices prepared as described above are mixed together, coagulated, dried and characterized as described in Example 1. The results are given in Table 2.

The fluoroelastomer composition is formulated as described in Example 1.

The mixture obtained is characterized as described in Example 1. The results are given in Table 4.

Example 7

Preparation of the Fluoroelastomer a)

After evacuating the air, 6.5 litres of demineralized water and 3 ml of a microemulsion having the same composition as that used in Example 1 are introduced into the same autoclave used in Example 1.

The autoclave is then brought to a temperature of 80° C. and maintained at this temperature throughout the reaction. The reactor is brought to a relative pressure of 25 bar by feeding in the monomers until the following composition of the gaseous phase is obtained: VDF/HFP/TFE 53/37/10 mol %.

13 g of APS are then introduced; the reaction is started and the pressure is kept constant through the polymerization by feeding in a gaseous mixture constituted of VDF/HFP/TFE 72/8/20 mol %. After feeding in 150 g of gaseous mixture into the reactor, 56 ml of $C_4F_8I_2$ are introduced. After feeding in 2.4 kg of the gaseous monomer mixture, 62 ml of the microemulsion having the same composition as that used in Example 1 are introduced.

After feeding in 3 kg in total of the gaseous monomer mixture, the reaction is stopped, the autoclave is cooled and the latex is emptied out.

An aliquot of the latex is coagulated, dried and characterized as described in Example 1.

The composition of the polymer is found to be as follows (mol %): VDF 71%, HFP 9%, TFE 20%.

The results are given in Table 1.

Preparation of the Fluoroelastomer b)

After evacuating the air, 13.4 litres of demineralized water and 67 ml of a microemulsion having the same composition as that used in Example 1 are introduced into a 20 litre autoclave equipped with breakwaters and a stirrer operating at 460 rpm. The autoclave is then brought to a temperature of 80° C. and maintained at this temperature throughout the reaction. The reactor is brought to a relative pressure of 30 bar by feeding in the monomers until the following composition of the gaseous phase is obtained: VDF/HFP/TFE 27/62/11 mol %.

The following are then introduced:
16.2 ml of ethyl acetate as chain-transfer agent;
11.55 g of ammonium persulphate (APS) as initiator, distributed as follows:
 6.9 g at the start of polymerization;
 1.65 g after feeding in 1.46 kg of gaseous monomer mixture;
 1.65 g after feeding in 2.92 kg of gaseous monomer mixture;
 1.35 g after feeding in 4.38 kg of gaseous monomer mixture.

The reaction is started and the pressure is kept constant throughout the polymerization by feeding in a gaseous mixture constituted of VDF/HFP/TFE 55/25/20 mol %. After 5.84 kg of the gaseous monomer mixture have been fed in, 12.7 ml of the microemulsion having the same composition as that used in Example 1 are introduced.

After feeding in 7.3 kg in total of the gaseous monomer mixture, the reaction is stopped, the autoclave is cooled and the latex is emptied out.

An aliquot of the latex is coagulated, dried and characterized as described in Example 1.

The composition of the polymer is found to be as follows (mol %): VDF 57%, HFP 24%, TFE 19%.

The results are given in Table 1.

Preparation of the Fluoroelastomer Composition

The latices prepared as described above are mixed together, coagulated, dried and characterized as described in Example 1. The results are given in Table 2.

The fluoroelastomer composition is formulated as described in Example 1.

The mixture obtained is characterized as described in Example 1. The results are given in Table 4.

Example 8

Preparation of the Fluoroelastomer a)

After evacuating the air, 13.4 litres of demineralized water, 5.5 ml of $C_4F_8I_2$ and 6.7 ml of a microemulsion having the same composition as that used in Example 1 are introduced into a 20 litre autoclave equipped with breakwaters and a stirrer operating at 460 rpm.

The autoclave is then brought to a temperature of 80° C. and maintained at this temperature throughout the reaction. The reactor is brought to a relative pressure of 38 bar by feeding in the monomers until the following composition of the gaseous phase is obtained: VDF/HFP/TFE 54/33/13 mol %.

26.8 g of ammonium persulphate (APS) as initiator are then introduced; the reaction is started and 60 ml of $C_4F_8I_2$ are introduced at a feed rate of 120 ml/h. When the relative pressure has reached 30 bar, a gaseous mixture constituted of VDF/HFP/TFE 67/13/20 mol % is fed in, while keeping the relative pressure constant at 30 bar throughout the polymerization. After 5.2 kg of the gaseous monomer mixture have been fed in, 12.7 ml of the microemulsion having the same composition as that used in Example 1 are introduced.

After feeding in 6.5 kg in total of the gaseous monomer mixture, the reaction is stopped, the autoclave is cooled and the latex is emptied out.

An aliquot of the latex is coagulated, dried and characterized as described in Example 1.

The composition of the polymer is found to be as follows (mol %): VDF 66%, HFP 15%, TFE 19%.

The results are given in Table 1.

Preparation of the Fluoroelastomer b)

The same latex of fluoroelastomer b) as in Example 7 is used.

Preparation of the Fluoroelastomer Composition

The latices prepared as described above are mixed together, coagulated, dried and characterized as described in Example 1. The results are given in Table 2.

The fluoroelastomer composition is formulated as described in Example 1.

The mixture obtained is characterized as described in Example 1. The results are given in Table 4.

Example 9

Preparation of the Fluoroelastomer a)

The same latex of fluoroelastomer a) as in Example 1 is used.

Preparation of the Fluoroelastomer b)

After evacuating the air, 6.5 litres of demineralized water, 3 ml of $C_4F_8I_2$ and 65 ml of a microemulsion having the same composition as that used in Example 1 are introduced into a 10 litre autoclave equipped with breakwaters and a stirrer operating at 545 rpm. The autoclave is then brought to a temperature of 80° C. and maintained at this temperature throughout the reaction. The reactor is brought to a relative pressure of 30 bar by feeding in the monomers until the following composition of the gaseous phase is obtained: VDF/HFP/TFE 27/62/11 mol %.

0.325 g of APS is then introduced; the reaction is started and the pressure is kept constant throughout the polymerization by feeding in a gaseous mixture constituted of VDF/HFP/TFE 55/25/20 mol %.

After feeding in 3 kg in total of the gaseous monomer mixture, the reaction is stopped, the autoclave is cooled and the latex is emptied out.

An aliquot of the latex is coagulated, dried and characterized as described in Example 1.

The composition of the polymer is found to be as follows (mol %): VDF 58%, HFP 21%, TFE 21%.

The results are given in Table 1.

Preparation of the Fluoroelastomer Composition

The latices prepared as described above are mixed together, coagulated, dried and characterized as described in Example 1. The results are given in Table 2.

The fluoroelastomer composition is formulated as described in Example 1.

The mixture obtained is characterized as described in Example 1. The results are given in Table 4.

Note for Tables 3 and 4 n.d. in the tables indicates that the die swell is not measurable since the surface of the extrudate is not smooth and the profile of the extrudate (edge) is uneven.

TABLE 1

| Ex. | Fluoro-elastomer | GPC Mn | Mw | Tg (° C.) | ΔH (J/g) |
|---|---|---|---|---|---|
| 1 | a) | 14 670 | 21 180 | −25.0 | 5.5 |
|   | b) | 255 000 | 572 000 | −10.0 | — |
| 2 Comparative | Tecnoflon FOR4391 | | | −12.0 | — |
| 3 Comparative | a) | 12 000 | 17 200 | −15.0 | — |
|   | b) | 334 000 | 819 300 | −15.0 | — |
| 4 Comparative | Tecnoflon FORTF636 | | | −27 | 0.2 |
| 5 | a) | 12 900 | 17 200 | −7.0 | — |
|   | b) | 218 700 | 697 900 | −21.0 | 7.19 |

TABLE 1-continued

| Ex. | Fluoro-elastomer | GPC Mn | Mw | Tg (° C.) | ΔH (J/g) |
|---|---|---|---|---|---|
| 6 | a) | 14 670 | 21 180 | −25.0 | 5.5 |
|   | b) | 207 500 | 637 000 | −15.6; −5.0 | 0.4 |
| 7 | a) | 15 200 | 40 200 | −19.4 | 11.1 |
|   | b) | 228 000 | 570 400 | −8.7 | — |
| 8 | a) | 16 400 | 26 200 | −21.5 | 1.99 |
|   | b) | 128 000 | 570 400 | −8.7 | — |
| 9 | a) | 14 670 | 21 180 | −25.0 | 5.5 |
|   | b) | 218 000 | 565 800 | −11.8 | — |

TABLE 2

| Fluoroelastomer composition Ex. | Tg (° C.) | ΔH (J/g) |
|---|---|---|
| 1 | −10.0; −22.0 | 1.7 |
| 2 Comparative | −13.0 | — |
| 3 Comparative | −15.0 | — |
| 4 Comparative | −27.0 | 0.2 |
| 5 | −4.4; −20.5 | 5.1 |
| 6 | −5.6; −22.3 | 2.2 |
| 7 | −8.3; −21.6 | 2.9 |
| 8 | −9.7; −21.7 | 0.4 |
| 9 | −12.5; −24.3 | 0.7 |

TABLE 3

| Fluoroelastomer formulation | Ex. 1 | Ex. 2 Comparative | Ex. 3 Comparative | Ex. 4 Comparative |
|---|---|---|---|---|
| Moulding conditions 170° C. 7 min post treatment (8 + 16 h) at 250° C. | | | | |
| Mechanical properties | | | | |
| Tensile strength MPa | 12.2 | 13.1 | 10.4 | 14.5 |
| M100 MPa | 2.5 | 3.1 | 1.4 | 4.2 |
| Elongation at break % | 240 | 230 | 360 | 260 |
| Hardness (Shore A) | 58 | 60 | 50 | 50 |
| Compression set O-ring 214 70 h at 200° C. | 33 | 38 | 38 | 27 |
| Garvey test at 40 rpm | | | | |
| Die temperature ° C. | 50 | 50 | 90 | 50 |
| Extruder temperature ° C. | 55 | 55 | 80 | 55 |
| Rating system B | | | | |
| edge | 10 | 3 | 10 | 4 |
| surface | A | C | A | C |
| Linear output cm/min | 54.5 | 35 | 48.6 | 40.1 |
| Die swell cm$^3$/cm$_{linear}$ | 0.57 | n.d. | 1.00 | n.d. |
| Dimensional stability | yes | no | no | no | n.d. = not determinable

TABLE 4

| Fluoroelastomer formulation | Ex. 5 | Ex. 6 | Ex. 7 | Ex. 8 | Ex. 9 |
|---|---|---|---|---|---|
| Moulding conditions 170° C. 7 min post treatment (8 + 16 h) at 250° C. | | | | | |
| Mechanical properties | | | | | |
| Tensile strength MPa | 9.1 | 10.3 | 14.0 | 15.5 | 15.5 |
| M100 MPa | 3.7 | 3.4 | 4.3 | 2.6 | 1.8 |
| Elongation at break % | 190 | 210 | 269 | 283 | 369 |
| Hardness (Shore A) | 64 | 62 | 64 | 60 | 58 |
| Compression set O-ring 214 70 h at 200° C. | 37 | 51 | 39 | 34 | 52 |

TABLE 4-continued

| Fluoroelastomer formulation | Ex. 5 | Ex. 6 | Ex. 7 | Ex. 8 | Ex. 9 |
|---|---|---|---|---|---|
| Garvey test at 40 rpm | | | | | |
| Die temperature ° C. | 90 | 50 | 50 | 50 | 50 |
| Extruder temperature ° C. | 80 | 55 | 55 | 55 | 55 |
| Rating system B | | | | | |
| edge | 10 | 10 | 10 | 10 | 10 |
| surface | B | A | A | A | B |
| Linear output cm/min | 70.5 | 57.0 | 73.2 | 68.8 | 51.9 |
| Die swell cm$^3$/cm$_{linear}$ | 0.66 | 0.62 | 0.50 | 0.65 | 0.63 |
| Dimensional stability | yes | yes | yes | yes | yes |

The invention claimed is:

1. An extrudable (per)fluoroelastomer composition comprising crosslinkable (per)fluoroelastomers having at least two glass transition temperatures Tg on DSC analysis, at least one melting peak on DSC analysis with a ΔH (enthalpy) of second melting of between 0.3 and 5.5 J/g, a bimodal molecular weight distribution such that a ratio $Mn_1/Mn_2$ is between 10 and 30, wherein $Mn_1$ represents the number-average molecular weight of the distribution of the high molecular weight fluoroelastomer and $Mn_2$ represents the number-average molecular weight of the distribution of the low molecular weight fluoroelastomer.

2. The extrudable (per)fluoroelastomer composition according to claim 1, comprising:
   a) a (per)fluoroelastomer with a glass transition temperature Tg1,
   b) a (per)fluoroelastomer with a glass transition temperature Tg2,
   Tg1 being different from Tg2.

3. The extrudable (per)fluoroelastomer composition according to claim 2, wherein the difference in absolute value γ between Tg1 and Tg2 is at least 6° C.

4. The extrudable (per)fluoroelastomer composition according to claim 2, wherein the (per)fluoroelastomer a) has a number-average molecular weight $Mn_2$ of between about 5000 and about 40 000, wherein the (per)fluoroelastomer b) has a number-average molecular weight $M_1$ of between about 100 000 and about 500 000.

5. The extrudable (per)fluoroelastomer composition according to claim 4, wherein the (per)fluoroelastomer a) has a number-average molecular weight $Mn_2$ of between about 10 000 and about 30 000, and wherein the (per)fluoroelastomer b) has a number-average molecular weight $Mn_1$ of between about 150 000 and about 350 000.

6. The extrudable (per)fluoroelastomer composition according to claim 1, which is obtained by mixing latices of the two (per)fluoroelastomers obtained from the separate polymerizations.

7. The extrudable (per)fluoroelastomer composition according to claim 1, comprising more than two (per)fluoroelastomers having on DSC analysis two Tg values, at least one melting point and a bimodal molecular weight distribution such that the ratio $Mn_1/Mn_2$ is between 10 and 30.

8. The extrudable (per)fluoroelastomer composition according to claim 2, wherein the ΔH of second melting is due to the (per)fluoroelastomer a) with Tg=Tg1, or to the (per)fluoroelastomer b) with Tg=Tg2, or to both of them.

9. The extrudable (per)fluoroelastomer composition according to claim 8, wherein the ΔH of second melting is due to the (per)fluoroelastomer a).

10. The extrudable (per)fluoroelastomer composition according to claim 2, wherein the (per)fluoroelastomers a) and b) are in a perfluoroelastomer a):perfluoroelastomer b) weight ratio of from 10:90 to 50:50.

11. The extrudable (per)fluoroelastomer composition according to claim 1, wherein the (per)fluoroelastomers are selected from the group consisting of:
   (1) VDF-based copolymers, in which VDF is copolymerized with at least one comonomer selected from the group consisting of:
      $C_2$-$C_8$ perfluorooolefins,
      $C_2$-$C_8$ chloro- and/or bromo- and/or iodofluoroolefins,
      (per)fluoroalkyl vinyl ethers (PAVE) $CF_2$=$CFOR_f$, in which $R_f$ is a $C_1$-$C_6$ (per)fluoroalkyl,
      perfluorooxyalkyl vinyl ethers $CF_2$=CFOX, in which X is a $C_1$-$C_{12}$ perfluorooxyalkyl containing one or more ether groups,
      fluorovinyl ethers (MOVE) of general formula $CFX_1$=$CX_1OCF_2OR_1$, in which $R_1$ is a linear or branched $C_1$-$C_6$ perfluoroalkyl group or a linear or branched $C_1$-$C_6$ perfluorooxyalkyl group containing from one to three oxygen atoms, $X_1$=F or H, and
      $C_2$-$C_8$ non-fluorinated olefins (Ol); and
   (2) TFE-based copolymers, in which TFE, is copolymerized with at least one comonomer selected from the group consisting of:
      (per)fluoroalkyl vinyl ethers (PAVE) $CF_2$=$CFOR_f$, in which $R_f$ is as defined above,
      perfluorooxyalkyl vinyl ethers $CF_2$=CFOX, in which X is as defined above,
      $C_2$-$C_8$ fluoroolefins containing hydrogen and/or chlorine and/or bromine and/or iodine atoms,
      $C_2$-$C_8$ non-fluorinated olefins (Ol),
      fluorovinyl ethers (MOVE) of general formula $CFX_1$=$CX_1OCF_2OR_1$ as defined above, and
      perfluorovinyl ethers containing cyanide groups.

12. The extrudable (per)fluoroelastomer composition according to claim 11, containing, in mol %, 100% being the sum of the mole percentages of the monomers, a composition selected from the group consisting of:
   (a) vinylidene fluoride (VDF) 35-85%, hexafluoropropene (HFP) 10-45%, tetrafluoroethylene (TFE) 0-30%, perfluoroalkyl vinyl ethers (PAVE) 0-15%,
   (b) vinylidene fluoride (VDF) 50-80%, perfluoroalkyl vinyl ethers (PAVE) 5-50%, tetrafluoroethylene (TFE) 0-20%,
   (c) vinylidene fluoride (VDF) 20-30%, $C_2$-$C_8$ non-fluorinated olefins (Ol) 10-30%, hexafluoropropene (HFP) and/or perfluoroalkyl vinyl ethers (PAVE) 18-27%, tetrafluoroethylene (TFE) 10-30%,
   (d) tetrafluoroethylene (TFE) 50-80%, perfluoroalkyl vinyl ethers (PAVE) 20-50%,
   (e) tetrafluoroethylene (TFE) 45-65%, $C_2$-$C_8$ non-fluorinated olefins (Ol) 20-55%, vinylidene fluoride 0-30%,
   (f) tetrafluoroethylene (TFE) 32-60% mol %, $C_2$-$C_8$ non-fluorinated olefins (Ol) 10-40%, perfluoroalkyl vinyl ethers (PAVE) 20-40%, fluorovinyl ethers (MOVE) 0-30%, (g) tetrafluoroethylene (TFE) 33-75%, perfluoroalkyl vinyl ethers (PAVE) 15-45%, vinylidene fluoride (VDF) 5-30%, hexafluoropropene HFP 0-30%, perfluoroalkyl vinyl ethers (PAVE) 0-15%,
(h) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%, and
(i) tetrafluoroethylene (TFE) 20-70%, fluorovinyl ethers (MOVE) 30-80%, perfluoroalkyl vinyl ethers (PAVE) 0-50%.

13. The extrudable (per)fluoroelastomer composition according to claim 1, wherein one or more (per)fluoroelastomers comprise monomer units derived from a bis-olefin having the general formula:

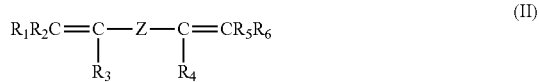
(II)

wherein:
$R_1, R_2, R_3, R_4, R_5$ and $R_6$, which are identical to or different from each other, are H or $C_1$-$C_5$ alkyl;
Z is a linear or branched $C_1$-$C_{18}$ alkylene or cycloalkylene radical, optionally containing oxygen atoms, or a (per)fluoropolyoxyalkylene radical.

14. The extrudable (per)fluoroelastomer composition according to claim 13, wherein the amount of chain units derived from these bis-olefins is between 0.01 and 1.0 mol per 100 mol of the other monomer units constituting the (per)fluroelastomer.

15. A curable manufactured product that is obtained by extrusion of the (per)fluoroelastomer composition according to claim 1.

16. A curable manufactured product that is obtained by coextrusion of the (per)fluoroelastomer compositions according to claim 1 and one or more fluorinated or non-fluorinated elastomers and/or one or more fluorinated or non-fluorinated thermoplastic polymers.

17. A cured manufactured product that is obtained by curing the manufactured product according to claim 15.

* * * * *